May 1, 1923.
C. H. MATTHIESSEN, JR
1,453,801
VALVE MECHANISM FOR INTERNAL COMBUSTION ENGINES
Filed Sept. 9, 1920
5 Sheets-Sheet 1
Fig. 1.
Fig. 2.
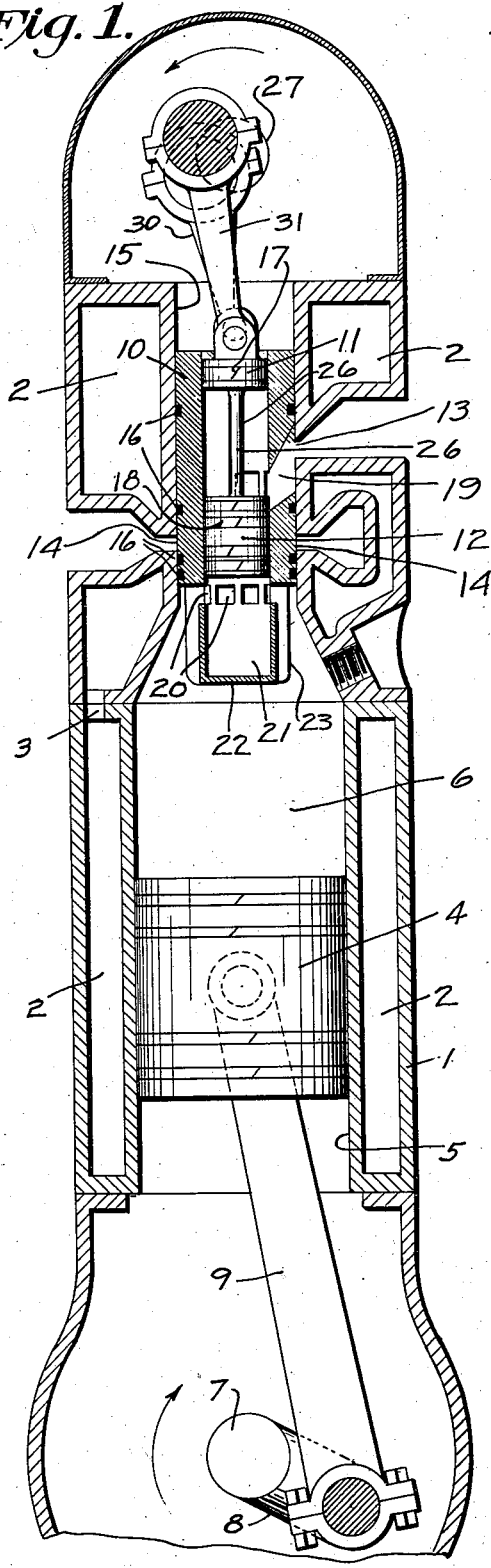
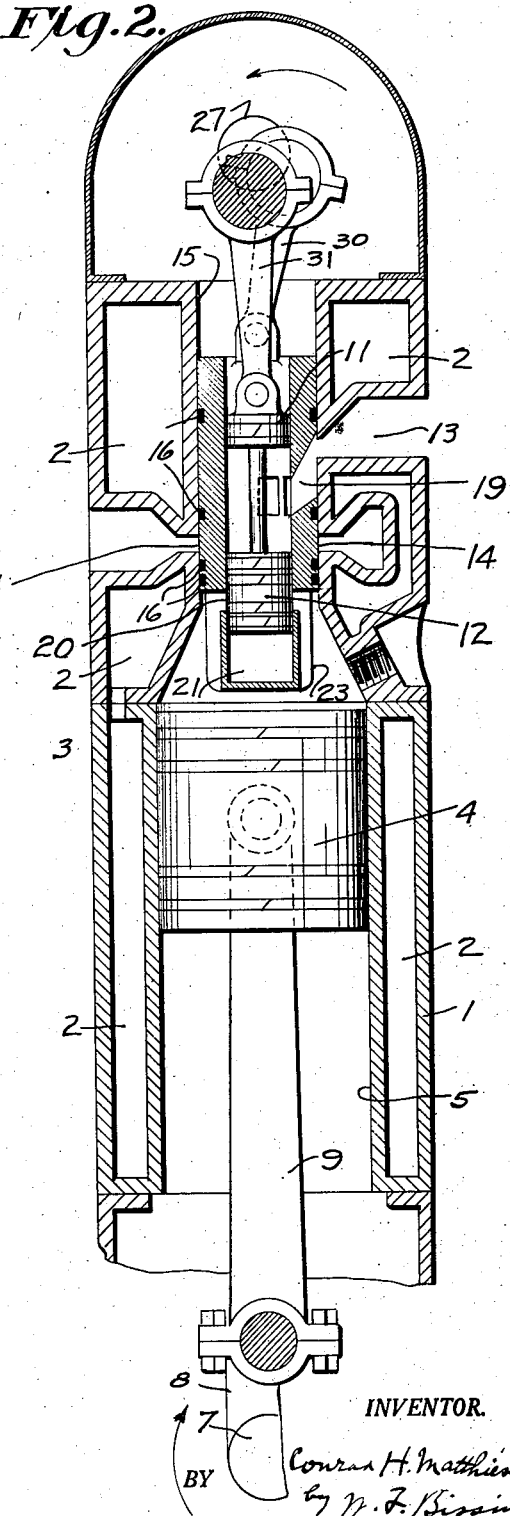
INVENTOR.
Conrad H. Matthiessen
BY W. F. Bissing
ATTORNEY May 1, 1923.
C. H. MATTHIESSEN, JR
VALVE MECHANISM FOR INTERNAL COMBUSTION ENGINES
Filed Sept. 9, 1920 5 Sheets—Sheet 2
1,453,801
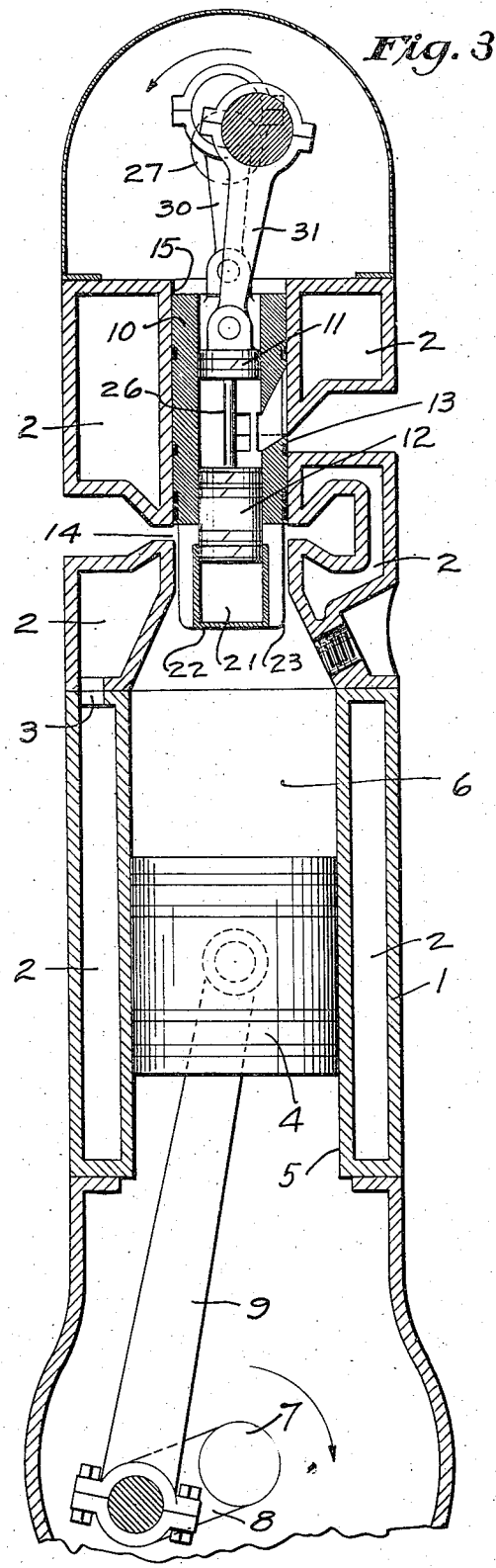
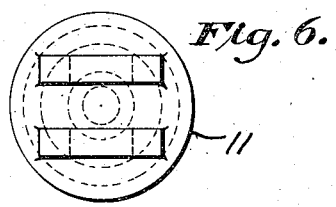
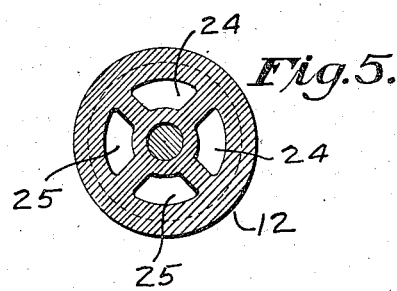
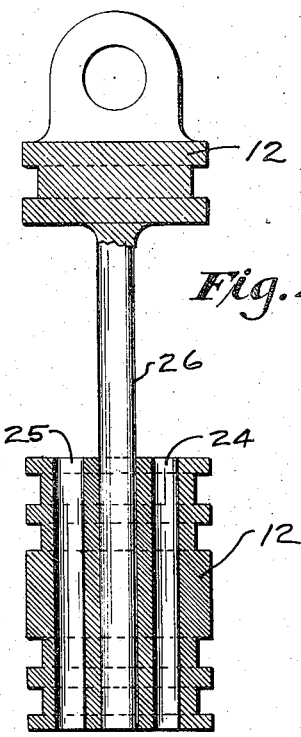
INVENTOR.
Conrad H. Matthiessen, Jr.
BY W. J. Bissing
ATTORNEY.

May 1, 1923.

C. H. MATTHIESSEN, JR 1,453,801

VALVE MECHANISM FOR INTERNAL COMBUSTION ENGINES

Filed Sept. 9, 1920

INVENTOR
Conrad H. Matthiessen, Jr.
BY
W. J. Bissing
ATTORNEY

May 1, 1923.
C. H. MATTHIESSEN, JR
1,453,801
VALVE MECHANISM FOR INTERNAL COMBUSTION ENGINES
Filed Sept. 9, 1920
5 Sheets-Sheet 4
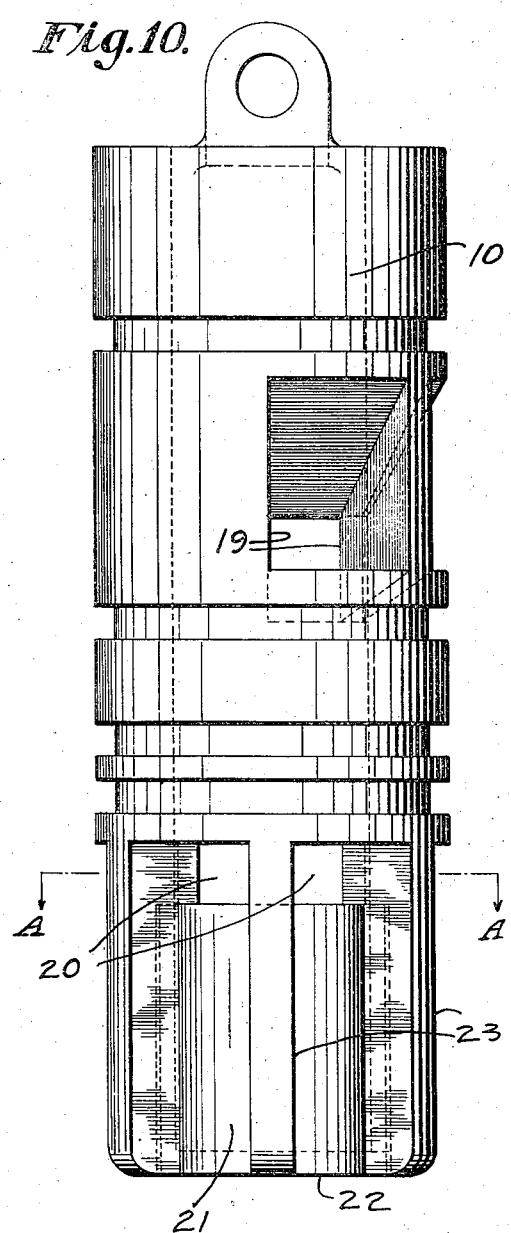
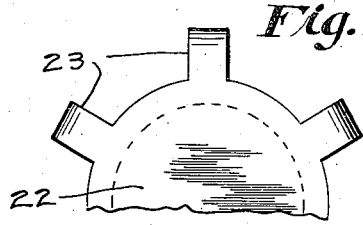
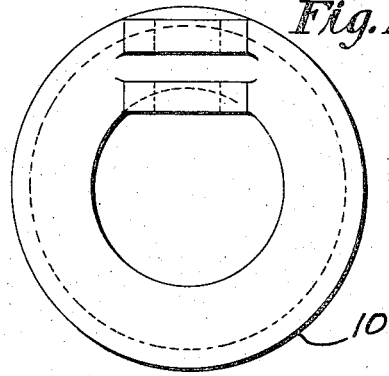
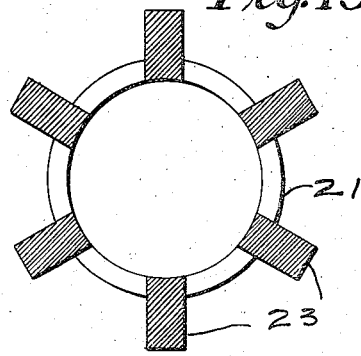
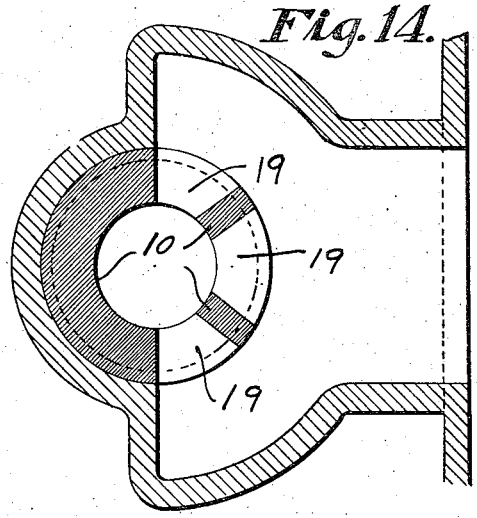
INVENTOR.
Conrad H. Matthiessen, Jr.
BY
W. F. Bissing
ATTORNEY.

May 1, 1923.

C. H. MATTHIESSEN, JR 1,453,801

VALVE MECHANISM FOR INTERNAL COMBUSTION ENGINES

Filed Sept. 9, 1920   5 Sheets-Sheet 5

INVENTOR.
Conrad H. Matthiessen, Jr.
BY
W. J. Bissing
ATTORNEY

Patented May 1, 1923.

1,453,801

UNITED STATES PATENT OFFICE.

CONRAD H. MATTHIESSEN, JR., OF IRVINGTON-ON-HUDSON, NEW YORK.

VALVE MECHANISM FOR INTERNAL-COMBUSTION ENGINES.

Application filed September 9, 1920. Serial No. 409,183.

*To all whom it may concern:*

Be it known that I, CONRAD H. MATTHIESSEN, Jr., a citizen of the United States, residing at Irvington-on-Hudson, New York, have invented new and useful Improvements in Valve Mechanism for Internal-Combustion Engines, of which the following is a specification.

My invention relates to a valve mechanism for internal combustion engines of the four cycle type. One of the objects of the invention is to retain the advantages resulting from two nested or telescoping slides mounted in an open cylinder head or in an open throat or extension thereof and sealed by rings, without having the disadvantage resulting from the adverse pressure upon the valves due to the force of the explosion.

By reason of such nested or telescoping slide valves properly constructed and timed, full port opening is maintained for the admission of the gases thruout a large part of the intake cycle and a large port opening is provided for the quick discharge of the spent gases. Compression is maintained by means of packing or sealing rings, which are similar to those used on the main or working piston. Quiet and positive operation results from elimination of return springs and by the provision of positive connections between the valves and their operating shaft.

In accordance with my invention, I make use of an unbalanced outer valve member, mounted in the open cylinder head or throat, subject to the pressure of the explosion and driven by the speed reduction gearing from the crank or power shaft of the engine. In cooperation therewith I make use of a balanced inner valve member. These two valve members control the admission of the gas and the outer one also controls the exhaust. Adverse pressure against the inner valve member is neutralized or eliminated thruout the cycles of the engine. Adverse pressure upon the valve members, as for example in the wrong direction, will ordinarily create shock on a crank pin. This adverse pressure would drive the inner slide at the time of the explosion if its distal end were exposed to the force thereof oppositely to the direction it is being driven by the power shaft, for the inner slide crank, at the time of the explosion, would ordinarily be somewhat, as for example 10 degrees, in advance of its bottom dead-center position, and an explosive pressure at that time would give a heavy blow or unyielding shock against the valve shaft or some part of the valve mechanism.

The sleeve or outer slide crank being already at the time of the explosion in a favorable position to yield in the direction of its rotation, i. e., it being a substantial amount, as for instance 40 degrees beyond the bottom dead center position, a blow upon it by the explosion will merely cause it to yield, thus decreasing the shock on the crank pin and decreasing the wear on the crank pin bearing.

In accordance with my invention, I mount the inner slide within the outer sleeve and protect it from the effect of the explosion by a construction including a cup-like inner end on the sleeve, forming a pocket with a closed bottom, into which the inner member slides, there being intake posts in this cup, or between it and the body of the sleeve, which are controlled by the relative movement of the two members. The outer member alone controls the exhaust, by covering and uncovering exhaust ports in the stationary cylinder casting.

Turning now to the drawings forming a part of the specification, Fig. 1 illustrates a vertical section thru the valve mechanism with the intake full open.

Fig. 2 is a vertical section thru the valve mechanism with the intake and exhaust closed and the working piston in the top dead center position, the parts being in about firing relation.

Fig. 3 shows a vertical section with the exhaust full open.

Fig. 4 is a detail cross section of the inner slide.

Figs. 5 and 6 are respectively cross sections and top views of the construction shown in Fig. 4.

Fig. 10 is a side elevation of the outer slide.

Fig. 11 is a bottom plan view of the slide shown in Fig. 10.

Fig. 12 is a top plan view of the construction shown in Fig. 10.

Figs. 13 and 14 illustrate sections on the lines A—A of Fig. 10 and B—B of Fig. 7 respectively.

Figure 8:
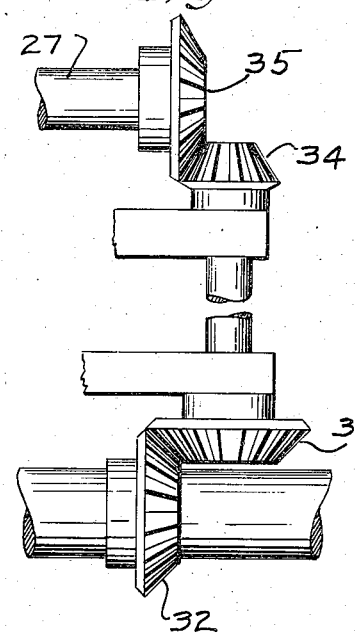
Fig. 8 is a view of the half time speed reduction gearing between the crank shaft and the valve shaft.
Figure 7:
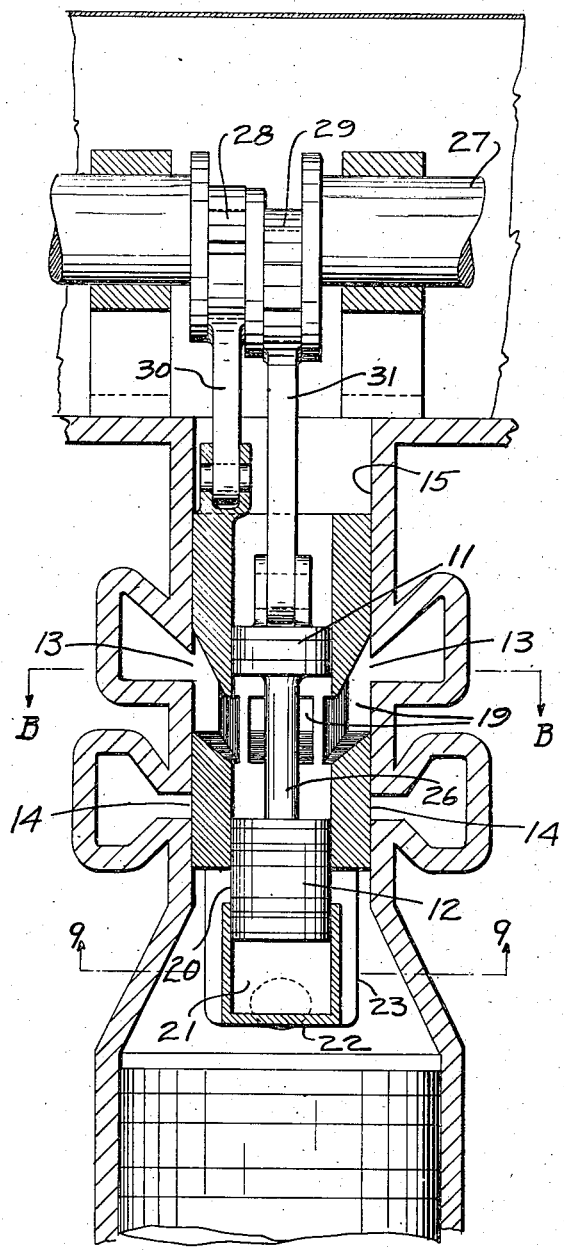
Fig. 7 is a partial section with inlet and exhaust closed, showing the parts as in Fig. 2 but from a different plane of view.
Figure 9:
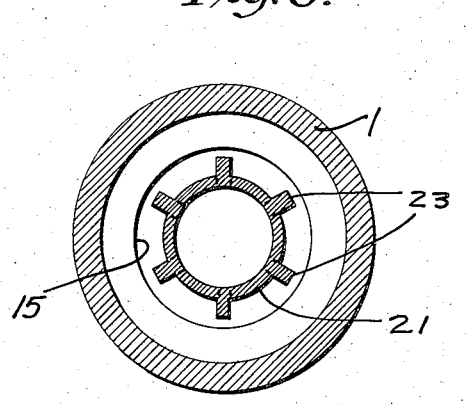
Fig. 9 is a section thru the outer slide member of Fig. 7.

The gas engine which is of the four cycle type is provided with the usual frame 1 which may be water-jacketed at 2, the upper and lower portions of the water jacket communicating at 3.

A working piston 4 provided with the usual rings, slides in the cylinder 5, the latter provided with the usual combustion space 6.

A power shaft 7, crank 8 and connecting rod 9 transmit the power produced by the explosion upon the working piston 4.

The valve mechanism comprises a pair of telescoping slide members mounted in the head or end of the cylinder. In accordance with my invention the outer slide 10 has a cup-shaped or pocket-like end and is unbalanced, while the inner slide is shielded from the force of the explosion and is therefore balanced. The inner slide comprises two members 11 and 12 sliding within the outer slide.

The admission or intake for the gases takes place thru the inlet ports 13 and the exhaust thru the port 14.

The exhaust ports may extend entirely around the valve mechanism and as illustrated upon the drawings extend around the throat 15 which is of smaller diameter than the combustion chamber, in which throat the valve mechanisms are mounted to operate.

The intake ports 13, however, do not extend entirely around the throat but no more than half way. This gives a direct and free passage for the incoming gas.

Both the outer and inner slide members carry packing and sealing rings 16, 17, 18 so as to provide a seal against the pressures developed in the operation of the engine, the outer slide controlling the exhaust ports.

Turning now to the outer slide 10, I construct it in a special way so that it provide means for shielding the inner unbalanced valve members from the force of the explosion. The outer slide is provided with ports 19 which in the form of the invention illustrated extend no more than half way around the slide, and is also provided with a series of ports 20 which may extend entirely around the outer slide. On the outer side the ports 19 are considerably increased in height, so that they may register with the intake ports of the cylinder during the downward motion of the valve thruout the intake stroke.

The outer slide terminates in a cup or pocket 21 with closed bottom 22. The cup is supported by means of longitudinal fins 23 connected with the outer slide and which serve also to cool the cup when the incoming gases pass into the combustion chamber thru the ports 20. The incoming gases are warmed somewhat by passing over the fins.

In the best embodiment of the invention two inner slide members are provided, separate from each other and connected by a stem. The lower slide member 12 is provided with one or more passageways or ports 24, 25, so as to establish communication between the two sets of ports in the outer slide.

The upper slide member is preferably in the form of a solid piston which prevents air being sucked in past the piston during the intake stroke of the working piston. The two slide members are connected by the stem 26.

Fig. 4 is a detail view of the inner valve member. This member in connection with the outer slide, controls the inlet of gases. The upper member always remains above the ports of the outer member as in Fig. 1 and besides preventing air from being drawn into the cylinder at the time of the intake by the suction of the main working piston, also acts as a guide giving greater skirt length to the valve and prevents canting or slip.

The valve mechanism may be driven by means of an overhead valve shaft 27 to which the outer and inner slide members are suitably connected as by means of cranks 28, 29 and connecting rods 30 and 31. The valve shafts are preferably driven in the direction of their arrows from the power shaft by means of reduction gearing. In the form illustrated bevel gears 32, 33, 34 and 35 mechanically drive the valve shaft from the power shaft. The organization is such that the outer sleeve member alone acts to control the exhaust while the outer and inner slides together control the inlet by their relative movement.

The operation of the mechanism will be clear from the description and from the illustration showing the parts in different positions. With the parts as in Fig. 2, which indicates the firing position, the exhaust ports 14 are closed and sealed by the outer valve member and its rings. The intake ports 20 in the outer valve member are closed and sealed by the lower inside slide member 12 and its rings. At the time of firing the inner slide member is protected from the force of the explosion in such a way that it will not receive an axial thrust or a tendency to slide or reciprocate and thus move the valve shaft. There is no tendency, therefore, to reverse the direction of rotation of the valve shaft by the motion of the inner plug or the forces acting upon it.

It will be noted from Fig. 2 that the outer member is exposed to the explosive force of the gases. However this outer slide member of the valve mechanism has been moving outward and upward assisted by the compression in the cylinder. At the point of firing the connecting rod and crank affecting the outer slide member are in a favorable position to receive the explosion and to overcome the friction of the rings and raise the slide outward and upward. The parts are so proportioned and the throat in which the valve mechanism slides is made sufficiently small and the surfaces subjected to pressure upon the outside valve member are so reduced that the power impulse arising from the explosion is preferably completely absorbed in overcoming the friction and gravity in the valve members and their rings.

With the parts as in Fig. 3 after the explosion and with the exhaust ports 14 full open, the spent gases readily find their way out thru the exhaust ports. The crank on the power shaft is shown in Fig. 3 as having passed more than half way in its revolution beyond the position shown in Fig. 2.

After the exhaust stroke the intake begins and is followed by the condition where the intake is full open as shown in Fig. 1, the lower end of the inner valve member being above the ports 20 in the outer member.

A rapid opening and closing of the intake ports is produced during the intake cycle, part of which is illustrated in Fig. 1 for the opening is produced by the motion of the inner and outer slides in opposite directions, the inner slide moving outwardly to open at the same time that the outer slide is moving inwardly toward the combustion space. After opening, both slides move together in the same direction, thus maintaining a complete opening of the inlet port 20, for a large part of the intake stroke. Thereupon there is a rapid cut-off or closing of the intake part by reason of the high speed of the inner slide which is at about its maximum speed at that time.

During this inlet stroke the outer sleeve is assisted in its downward travel by the suction of the main piston.

Figure 15:
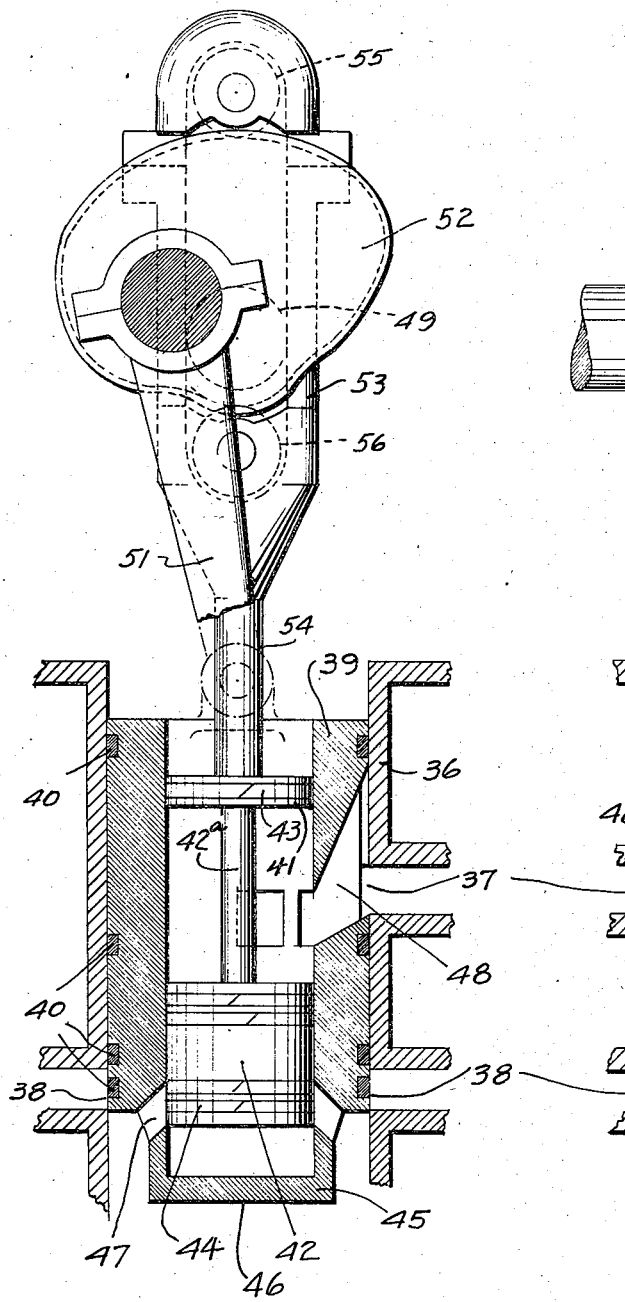
Figs. 15 and 16 illustrate a section and a side elevation of another embodiment of the invention.
Figure 16:
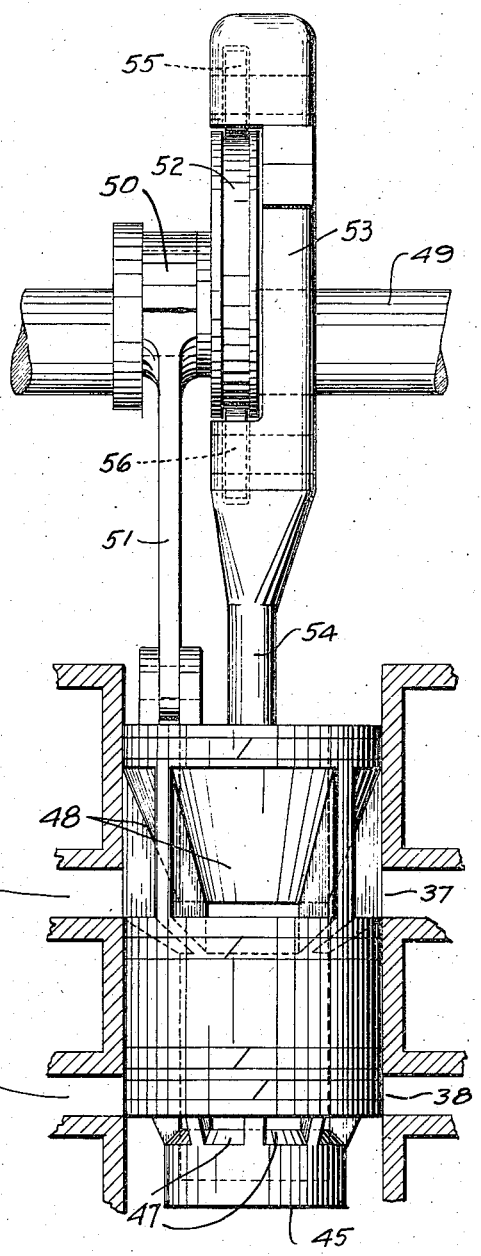

Turning now to the embodiment of the invention shown in Figs. 15 and 16, I have provided a valve mechanism in which the relative motion between the slides can be reduced to a minimum. The valve casing or throat 36 is attached to the head or end of the cylinder. It is provided with a semicircular set of inlet ports 37 and a series of exhaust ports 38. The outer slide member 39 carries rings 40 and the inner slide members 41 and 42 connected by a road 42ᵃ carry rings 43 and 44. The outer slide carries a short cup-shaped bottom or pocket 45 with closed bottom 46 and a series of inlet ports 47 which may extend around the top of the cup. The lower inner slide member 42 is provided with longitudinal passageways or ports like those in the lower slide illustrated in Fig. 4 which passageways will serve to form a communication between the inlet ports 47 and the upper inlet ports 48 of the outer slide. The upper set of inlet ports 48 are semicircular in extent to correspond with the ports 37. The upper slide member or piston 41 is solid to prevent sucking air during the intake stroke and for guiding and other reasons. The slide valve mechanism is driven from an overhead valve shaft 49 by means of a crank and a cam. The crank 50 and connecting rod 51 are connected to the outer slide but the inner slide which is not subjected to pressure or the force of the explosion is driven by a cam 52 and yoke 53 having a stem 54 connected to the inner slide. The yoke carries two rollers 55 and 56 running in the cam groove and the cam is provided with a contour or track which will give a quick opening for the inlet and maintain the opening for the desired time, following it by quick closing.

It will be understood that the invention is not limited to details and that numerous changes may be made in carrying it into effect without departing from the principle thereof.

I claim—

1. A telescoping slide valve mechanism for four cycle gas engines, one part sliding within the other, the outer member forming a pocket into which the inner member slides, the pocket being provided with a closed bottom in combination with inlet and exhaust ports, two of the slide members by their relative motion controlling the inlet and the outer slide alone controlling the exhaust.

2. A telescoping slide valve mechanism for a four cycle gas engine, comprising two slides, one sliding within the other, the outer slide being provided with two sets of ports and the inner slide comprising a two-part member, one part being solid and the other provided with a port for establishing communication between the two sets of ports in the outer slide.

3. A telescoping slide valve mechanism for a four cycle gas engine, comprising two slides, one sliding within the other, the outer slide being provided with two sets of ports and the inner slide comprising a two-part member, the two parts of the member being connected by a stem, one part of the inner slide being solid and the other part provided with one or more ports for establishing communication between the two sets of ports in the outer slide.

4. A telescoping slide valve mechanism for a four cycle gas engine, comprising two slides, one sliding within the other, the outer slide being ported and the inner slide comprising two portions, one solid and the other ported, the two portions connecting by a stem.

5. A telescoping slide valve mechanism for a four cycle gas engine, comprising two slides one sliding within the other, the outer slide being provided with two sets of ports and terminating in a cup-shaped bottom portion for receiving the inner slide.

6. A telescopic slide valve mechanism for a four cycle gas engine, comprising two slides, one sliding within the other, the outer slide being provided with two sets of ports and terminating in a cup-shaped bottom portion for receiving the inner slide, said bottom portion provided with fins.

7. A telescopic slide valve mechanism for a four cycle gas engine, comprising two slides, one sliding within the other, the outer slide being provided with two sets of ports and terminating in a cup-shaped bottom portion for receiving the inner slide, and the inner slide comprising a two-part member, one part ported and sliding into the bottom portion and the other part solid and sliding within the top of the outer slide.

8. A telescopic slide valve mechanism for a four cycle gas engine, comprising two slides, one sliding within the other, the outer slide being provided with two sets of ports and terminating in a cup-shaped bottom portion for receiving the inner slide, and the inner slide comprising a two-part member, one part ported and sliding into the bottom portion and the other part solid and sliding within the top of the outer slide, the two parts of the piston being separated from each other and connected by a stem.

9. A telescopic slide valve mechanism for a four cycle gas engine, comprising two slides, one sliding within the other, the outer slide being provided with two sets of ports and terminating in a cup-shaped bottom portion for receiving the inner slide, the bottom portion provided with longitudinal ribs and the inner slide comprising a two-part member, one member ported and sliding into the bottom portion of the outer slide, providing a communication between the two sets of ports of the outer slide and the other member of the inner slide being solid and closing the top of the inner slide, the two inner slide members being separated but connected by a stem.

10. A telescoping slide valve mechanism for a four cycle gas engine, comprising two slides one sliding within the other, the outer slide being provided with two sets of ports, one set of ports extending no more than half way around the slide and the inner slide comprising a two-part member, one part solid and the other provided with a port for establishing communication between the two sets of ports and the outer slide, together with intake and exhaust ports for supplying gas to and discharging waste gases from the combustion space of the cylinder, the intake ports likewise extending substantially no more than half way around the valve head.

11. The combination with the combustion cylinder of a gas engine of the four cycle type, of a valve head mounted upon the end of said cylinder, a throat of smaller diameter than the cylinder located in said valve head, and a two-part telescoping slide valve mechanism arranged in said throat, one part sliding within the other, the outer part provided with two sets of ports, one set extending about half way around the outer slide, the outer slide terminating in a cup-shaped portion into which the inner slide moves, said throat being provided with intake and exhaust ports, the intake ports extending about half way around the throat.

12. A telescoping slide valve mechanism for four cycle gas engines, one part sliding within the other, the outer member forming a pocket for the inner slide, the pocket being provided with a closed bottom exposed to the pressure in the combustion chamber, and mechanical connections between the valve mechanism and the power shaft of the engine for driving the valve mechanism, two of the slide members by their relative motion controlling the inlet and the outer slide alone controlling the exhaust.

13. In an internal combustion engine, the combination of a power cylinder and a throat in the head end thereof, said throat containing exhaust ports, a driven reciprocating sleeve in the throat alone controlling the exhaust by covering and uncovering said ports, said sleeve having a closed cup at its inner end and intake ports between said cup and the body of the sleeve, and an inner mechanically driven reciprocatory valve member operating in said sleeve and cup, the intake being controlled by the relative movement of the two valve members in relation to said intake ports.

In testimony whereof, I have signed my name to this specification.

CONRAD H. MATTHIESSEN, Jr.